Oct. 13, 1936.   C. DE GANAHL   2,057,017
SPOT WELDING MEMBERS ONTO METALLIC TUBES
Filed May 13, 1933   3 Sheets-Sheet 1
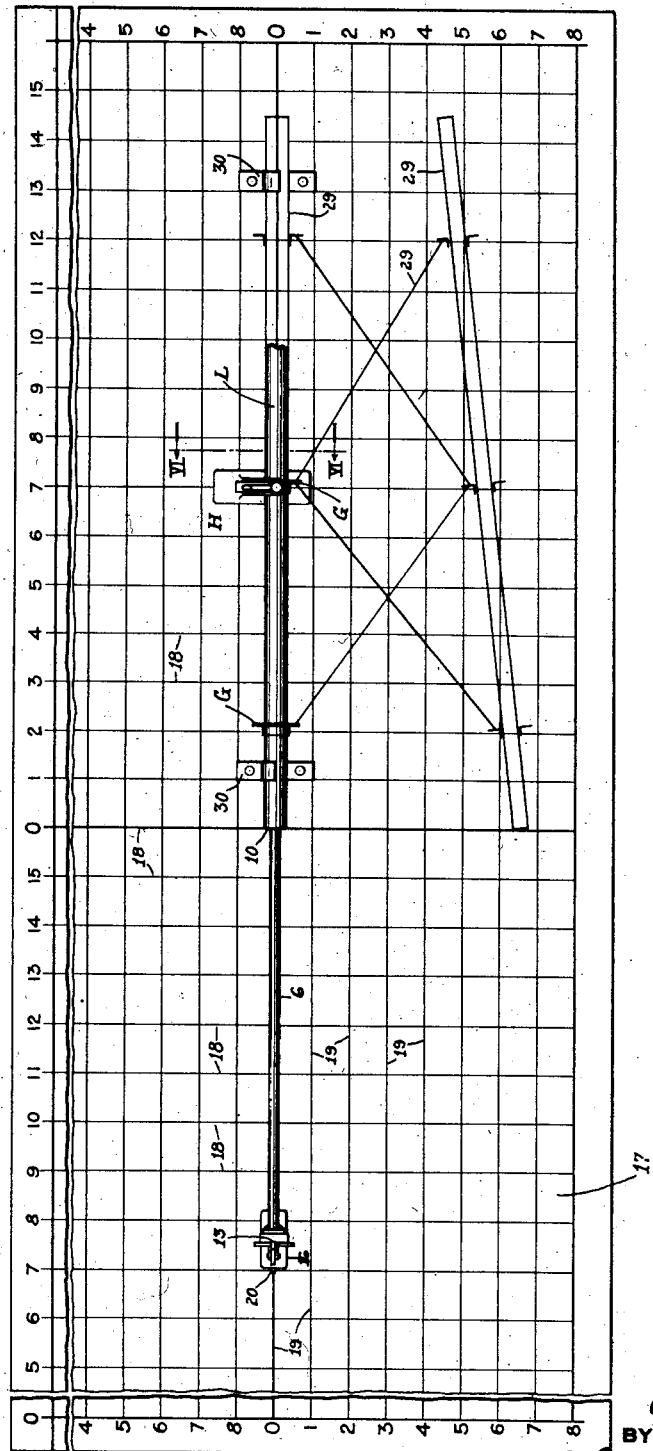
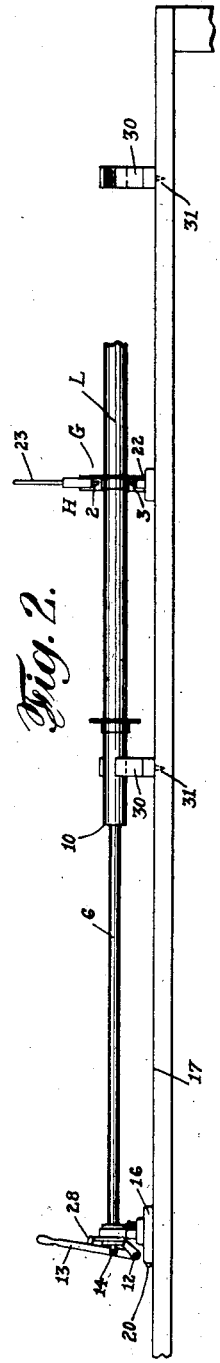
INVENTOR
*Carl De Ganahl*
BY
ATTORNEY Oct. 13, 1936.   C. DE GANAHL   2,057,017
SPOT WELDING MEMBERS ONTO METALLIC TUBES
Filed May 13, 1933   3 Sheets-Sheet 2
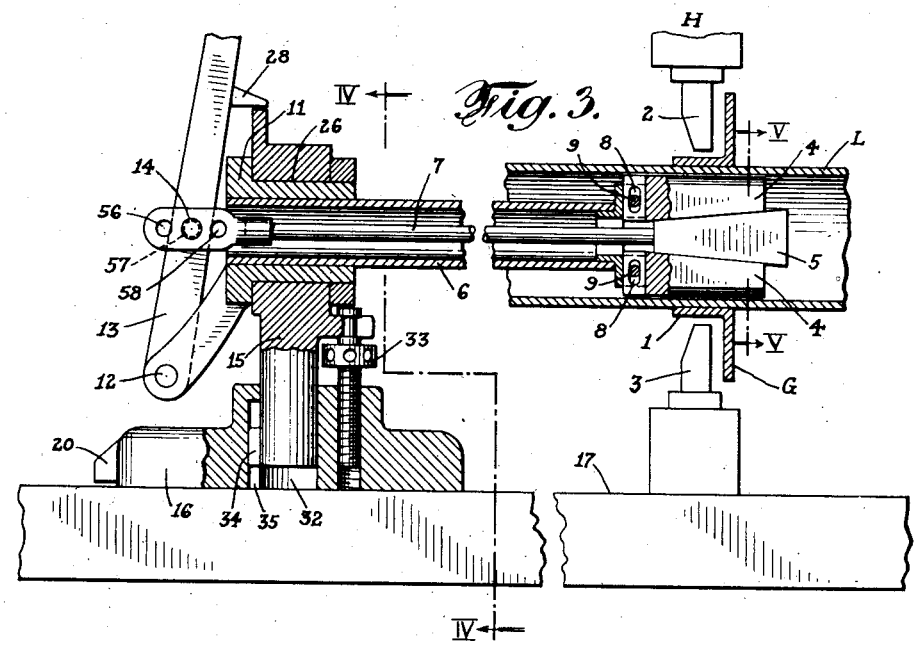
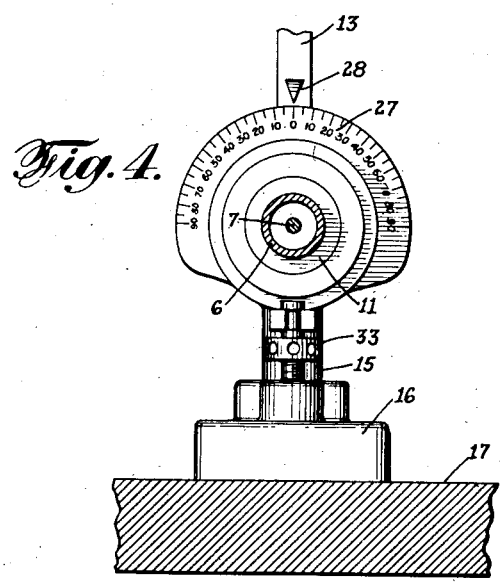
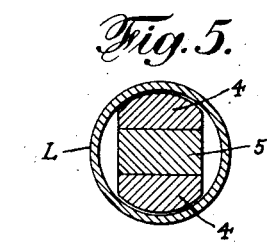
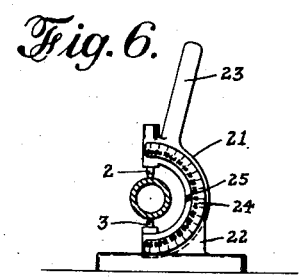
INVENTOR
Carl De Ganahl
BY
ATTORNEY

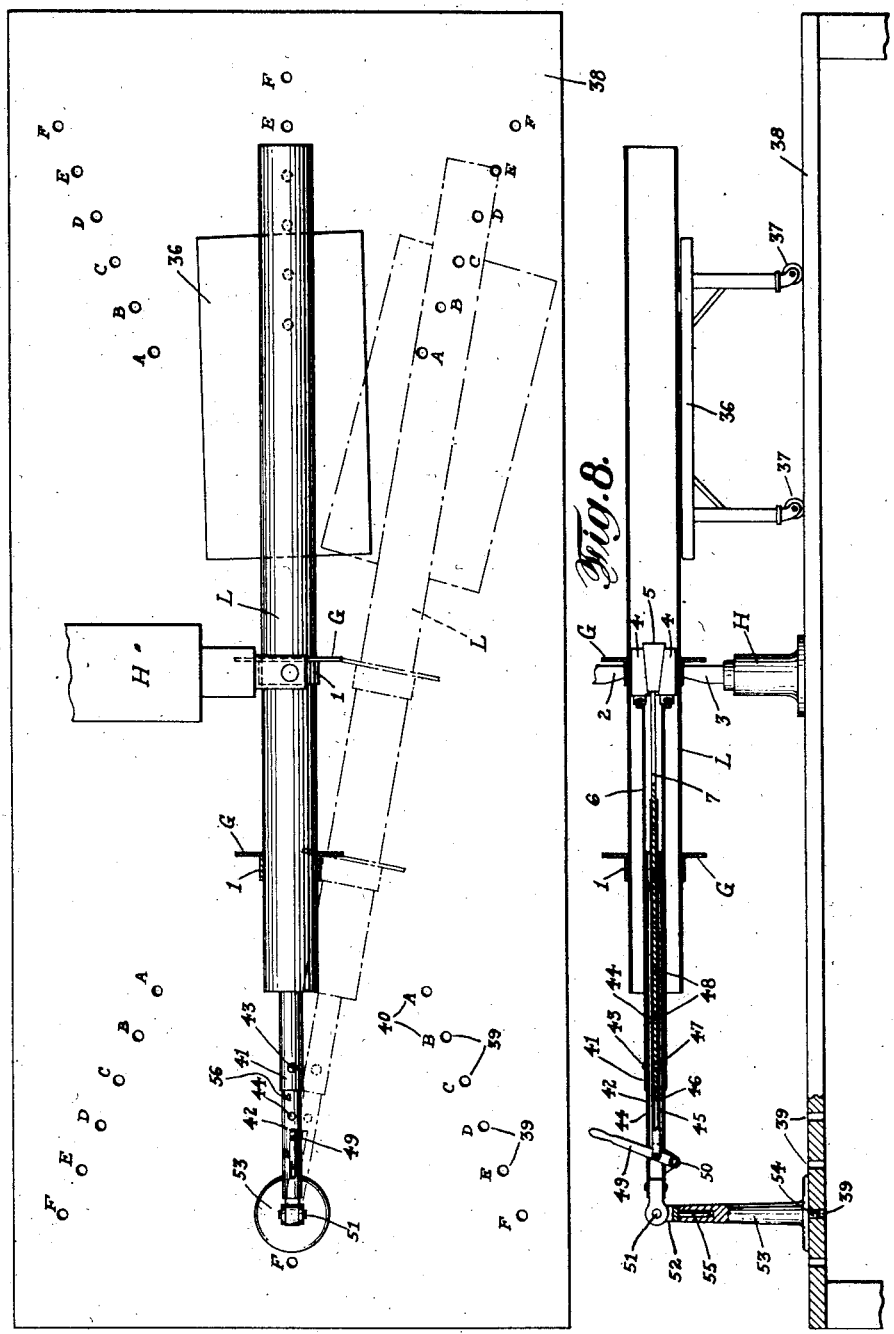

Patented Oct. 13, 1936

2,057,017

UNITED STATES PATENT OFFICE 2,057,017

SPOT WELDING MEMBERS ONTO METALLIC TUBES

Carl de Ganahl, Greenlawn, N. Y., assignor to Fleetwings, Inc., Long Island, N. Y., a corporation of Delaware Application May 13, 1933, Serial No. 670,849

20 Claims. (Cl. 219—4)

This invention relates to means for use in spot welding members onto metallic tubes, method and article.

An object of the invention is to provide a simple, practical and efficient device adapted for use in spot welding members at different selected points exteriorly along the length of a metallic tube.

A further object is to so construct said device that it will include appropriate supporting means for the tube, a backing means interiorly of the tube to prevent collapse of the tube during the welding operation, and means to readily determine the position of said backing means at all times, both rotatably and longitudinally of the tube, with respect to the exterior electrodes employed.

A further object is to so construct the backing means and its supporting and operating mechanism that it may be readily inserted into the tube so as to stand at any desired location either longitudinally or rotatably of the tube and so that it may be readily expanded to rest tightly against the portions of the tube which receive pressure from the exterior electrodes in use.

A further object is to provide for convenient adjustment of the backing means so that it may be used in tubes of widely different diameters.

A further object is to so construct the operating mechanism of the backing means that it will include an adjustable supporting standard by which the elevation of the backing means and its operating mechanism may be altered at will.

A further object is to provide means by which to adjustably alter the length of connecting parts between the backing means and its operating mechanism so that these parts may be adapted for convenient use in working upon tubes of different lengths.

A further object is to provide an improved method of procedure to be followed in attaching members exteriorly at different selected points longitudinally of metallic tubes.

A further object is to provide a method according to which the tube may stand stationary in a position corresponding to that in which it will be ultimately used and according to which one or more annular flanges may stand stationary in position upon said tube corresponding with the position ultimately to be occupied by said flange or flanges, and according to which said flanges may be conveniently and efficiently spot welded onto the tube without at any time disturbing either the tube or the flanges.

A further object is to provide a hollow metallic tube having separately formed annular flange members thereon at any selected localities intermediate the length of the tube, said annular flanges having sleeve portions telescoped onto said tube and spot welded thereto.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a top plan view of a device constructed in accordance with this invention and showing the same as it appears in use.

Fig. 2 is a front elevational view of the parts illustrated in Fig. 1.

Fig. 3 is an enlarged detail sectional view showing the construction of the backing means, its manner of use, and the supporting and operating mechanism therefor.

Fig. 4 is a vertical sectional view substantially upon the plane of line IV—IV of Fig. 3.

Fig. 5 is a sectional view upon the plane of line V—V of Fig. 3.

Fig. 6 is a detail sectional view upon the plane of line VI—VI of Fig. 1.

Fig. 7 is a view similar to Fig. 1 but illustrating a modified arrangement intended for use when working upon tubes of unusually large diameter, and Fig. 8 is a front elevational view of the structure seen in Fig. 7, parts being shown in vertical section for the disclosure of details.

Referring to the drawings for describing in detail the structures illustrated therein, and referring first to the structure illustrated in Figs. 1 to 6, the reference character L indicates a metallic tube. The reference character G indicates an annular flange having a sleeve 1 which telescopes closely onto the tube.

The welding tool is indicated generally by the reference character H and includes the opposite electrodes as 2 and 3. These electrodes are positioned at diametrically opposite sides of the tube and of sleeve 1 and it will be understood that during the welding operation they are clamped tightly against the work by any appropriate means so well understood as not to require illustration or further description here.

The backing means employed within the tube includes opposite anvils as 4—4 and an intermediate wedge 5. When this backing means is being inserted into the tube the wedge 5 is in such relation to the anvils as to allow the anvils a free sliding movement within the tube, but when the anvils have reached their proper positions of use with respect to the welding tool H then the wedge is squeezed between the anvils and operates to force the anvils apart and into tight engagement against the inner wall surface of the tube as a substantially solid metallic bridge between opposite walls of the tube, said bridge being of course preferably in a straight line between the two electrodes 2 and 3.

The backing means disclosed is of conductive material adapted for the easy transmission of current between the electrodes 2 and 3. The tube L, together with the sleeve 1, may in some instances constitute walls of such thinness as to be incapable of supporting the pressure of the electrodes 2 and 3, and in this case the backing means disclosed is of a further and great value as a mechanical support for this wall during the welding operation.

The operating mechanism for the backing means disclosed consists of one member as 6 connected with the anvils 4—4 and being preferably in the form of a hollow tube as shown, and a second member or rod as 7 connected with the wedge 5 and preferably extending through the hollow of the tube 6.

The anvils 4—4 are each preferably formed with a transverse slot as 8—8 within which engages a cross pin 9 carried by the rod or tube 6 so that while the anvils always move longitudinally with the tube 6 they are at the same time free to move laterally toward and away from each other.

The tube 6 and rod 7 are of a suitable length so as to always extend beyond the end as 10 of the tube L so that they may be manipulated from without said tube L for placing and operating the backing means 4—5 at any point lengthwise of the tube L.

Any appropriate means may be employed for manipulating the tube 6 and rod 7 exteriorly of tube L, and an example of such means as illustrated in the present drawings includes a sleeve 11 fixed about the tube 6 and formed with a bearing support 12 by which a lever 13 is pivotally mounted onto said tube 6, said lever in turn having the rod 7 pivotally connected therewith as at 14 at a point spaced from the pivot 12. Swinging movement of the lever upon pivot 12 will therefore move the wedge 5 with respect to the anvils, all as will be readily understood from an inspection of the drawings Fig. 3.

The sleeve 11 is shown as being supported upon a standard 15 having an enlarged base as 16 readily slidable in all directions along the surface of a supporting table 17.

Thus the operator by sliding the standard 15 along the table surface may move the backing means 4—5 lengthwise of the tube L, and then, by swinging the handle 13, may spread the anvils 4—4 into their operative positions against the inner surface of the tube L.

As a means by which to enable the operator to always conveniently determine the position of the backing means 4—5 within the tube L the drawings herewith show the table 17 to be marked off with a series of parallel lines 18—18 extending in one direction and a similar series as 19—19 extending in a direction at right angles to the first series. These lines are shown as numbered at the margin of the table. One of the lines 18, at a central location on the table, is made of a distinctive character and is numbered on the table as zero. The lines 18 at the right side of the zero line are numbered consecutively upwardly from 1 to 15. The lines at the left side of the zero line are numbered consecutively downwardly from 15 to 1.

The lines 19 at the lower side of the zero line 19 are numbered consecutively from 1 to 8. The lines at the upper side of the zero line 19 are numbered consecutively from 8 to 1.

All of lines 18—18 are the same distance apart, and the same is true of all of the lines 19—19.

The length of the backing means 4—5 and its supporting and operating mechanism is equal to the distance between any two lines of similar number at opposite sides of the zero line on the table, and thus the operator knows that by placing the indicator finger as 20 of the base 16 for instance at line 7 at the left of the zero line then the backing means 4—5 is in a proper operative position on line 7 at the right of the zero line, and that his welding tool H, if placed on the line 7 at the right of the zero line as shown in the drawings, is in a proper co-operative welding relationship with said backing means.

It is sometimes necessary that spot welds be made at different positions radially of the tube L, particularly when the member being welded onto the tube L is an annular flange member G with sleeve 1, and it is sometimes inconvenient and even impossible to rotate the tube with respect to the welding electrodes for this purpose. Hence it is a feature of this invention to provide means according to which spot welds may be made at any radial points as may be required.

To this end the drawings herewith, Fig. 6, suggest that the electrodes 2 and 3 may be carried in a frame member 21 which is mounted for rotatable adjustment about the center of the tube L in a supporting base 22, and an appropriate handle as 23 being provided for adjustably moving the frame 21 in its supporting base. The supporting base may preferably be provided with a scale 24 thereon and the frame 21 have a pointer as 25 movable with respect to the scale for indicating the angular position of the electrodes 2 and 3 in different positions of adjustment.

Also, the sleeve 11 which is fixed to the outer end of tube 6 is rotatably mounted in its carrying standard 15, being received in a suitable bearing as 26 of said standard for this purpose. The standard 15 is provided with a scale as 27 thereon, similar to the scale 24 of the supporting base 22, and a co-operative pointer finger as 28 is provided upon the lever 13 for indicating the angular position of the backing means 4—5 in different positions of adjustment of the finger 28 along the scale 27.

Thus an operator, to insure proper co-operative relationship between the electrodes 2—3 and the backing means 4—5 at any time, and having placed the electrodes 2—3 at an angular position indicated on scale 24, has merely to rotate the handle 13 to a similar indication on scale 27 before swinging the handle on pivot 12. The fact that the two pointer fingers 25 and 28 indicate like points at their respective scales 24 and 27 means that the electrodes 2—3 and the backing means 4—5 are in proper radial alignment within the tube L.

It should be noted here that in some instances the operator may use an ordinary hand tool for carrying the electrodes 2 and 3 and that in that instance he would simply so hold the tool as to place the electrodes 2 and 3 in their appropriate radial positions as indicated by the angular position of the lever 13 on a scale 27, there being in this case no other scale, as 24, for comparative purposes.

The table 17 may have drawn thereon lines as indicated 29 to represent a layout of structure of which the tube L forms a part, for instance a portion of an airplane wing, truss, brace or the like, and the drawings may show the exact positions of several elements, such as flanges G, with respect to the tube L, as clearly indicated in Fig. 1, and the tube L may be mounted on the table to directly overlie its drawn representation on the table, and the flanges G may be positioned on the tube also to exactly correspond with the drawn representation on the table. And the tube L may be suitably fixed in position upon the table as by means of the holding devices 30 illustrated, it being understood that these holding devices may be used to hold the tube in any desired position upon the table they being themselves movable from place to place about the table for this purpose and being adapted to be fixed to the table in any location as for instance by means of holding pins or the like as 31—31.

In this way the operator, throughout the work of welding tight the flanges G, has before him a comprehensive picture of the several elements which in use co-operate with the parts upon which he is operating and he is in consequence better able to discern the importance of accuracy and efficiency in certain details of his work. The mechanism herein shown and described enables him to accurately and efficiently perform the operation of welding the flanges G to the tube L in any precise position desired lengthwise of the tube L, and in any position rotatively of said tube L without in the slightest degree displacing either the tube or the parts being welded thereto.

In performing his work the operator may first fix the tube L in position upon the table exactly overlying its drawn representation 29 on the table, and adjust the flange members or the like to correspond with the positions of said members as indicated on the table drawing. Then, noting the position of one of the flange members G as being in register, for instance, with line numbered 7 on the table at the right of the zero line, he then introduces his backing means 4—5 into the tube from the left hand end and to an extent determined by positioning the indicator finger 20 of base 16 in register with line numbered 7 at the left of the zero line, throws the handle 13 to spread the anvil members 4—4 within the tube, then brings the electrodes 2 and 3 of the welding tool H against the sleeve 1 of the flange G and proceeds to apply the welding current.

In cases where it is undesirable or impractical to rotate the tube L for impressing subsequent welds at spaced points rotatively of the sleeve 1, the operator, having of course returned the lever 13 to release the anvils 4—4, proceeds to rotate the backing means 4—5 and the electrodes 2—3, as hereinabove explained, from place to place rotatively of the tube, spreading the anvil members and applying the welding current at each desired rotative position until the member G is satisfactorily fixed to the tube. He then moves the backing means 4—5 longitudinally of the tube into register with the next member G which is to be welded, simply noting the number of the line on the table with which the new member G registers and placing the finger 20 on the similarly numbered line at the left of the zero line as before for this purpose, moves the welding tool H to the new member G, and proceeds to repeat the welding operation.

When all of the members G have been fully fixed onto the tube L he then completely withdraws the backing means 4—5, removes the welding tool H, and releases the tube from the holding devices 30, the tube being then ready for installation as a part of a mechanical structure corresponding with that drawn, by lines 29, upon the table.

It is desirable that the standard 15 be made vertically adjustable, so as to enable correct positioning of the backing means 4—5 within tubes L of different diameters or where the longitudinal axes of such tubes are at different distances above the table 17, and as a means to this end the drawings herewith show the standard 15 to be vertically movable in a socket 32 of the base 16, also a screw operative device as 33 interconnected between the standard and the base for adjustably moving the standard in the socket 32 and for holding the standard in any position of vertical adjustment to which it may be moved.

A feather as 34 is shown as engaging within a slot as 35 to hold the standard 15 and base 16 against rotary movement with respect to each other, thereby always insuring position of the indicator finger 20 in the correct relation to the rod 7 and tube 6.

In the modified arrangement illustrated in Figs. 7 and 8, the structure shown is particularly desirable for the handling of heavier and more massive work than that contemplated with respect to the structure already described.

In the structure Figs. 7 and 8 the welding tool H is intended to be in a stationary location, and the tube L is mounted upon a carriage 36 fitted with castor wheels 37 by which it may be rolled in any direction about the table or floor as 38.

The table or floor 38 is provided with marks as 39—39, preferably in the form of socket holes, arranged in rows radiating from the welding electrodes 2 and 3 as a center. There may be as many of these rows as desired extending in different radial directions from the electrodes and they are each of a predetermined known distance from the electrodes. They may if desired have numbers or letters associated therewith, as indicated at 40. Each mark or hole having the same letter is the same distance from the electrodes.

The backing means 4—5 employed in this modified structure is the same as before and it is carried at the end of a tube 6 and rod 7 as before except that these elements 6 and 7 are in the present instance made adjustable as to length, the steps of adjustment corresponding with the distance between the marks or holes 39 radially from the electrodes, and the purpose, of course, being to enable the operator to always employ a length as most convenient for the work in hand.

As a convenient means of adjustment for the tube 6 the drawing Fig. 8 shows this tube to consist of an outer tubular member 41 and an inner tubular member 42 slidably telescoping together, one of said members, as the outer member 41, carrying a locking pin 43 and the other being formed with a series of apertures as 44—44 spaced apart the same distance as the holes 39 and adapted to selectively receive the locking pin 43.

As a convenient means of adjustment for the rod 7 the drawing Fig. 8 shows this rod to include an outer tubular shell part 45 and an inner rod part 46 slidably telescoping together, the shell part 45 carrying a locking pin 47 and the rod part 46 being formed with a series of apertures as 48—48 spaced apart also the same distance as the holes 39 and adapted to selectively receive the locking pin 47.

At its outer end the tube 6 has a lever as 49 pivoted thereon as at 50 and this lever has pivotally connected therewith the outer end of the rod 7 so that swinging movement of the lever 49 will operate the wedge 5 to spread the anvils 4—4 in the same manner as in the previous structure.

Beyond the lever 49 the tube 6 is pivotally connected, on a horizontal pivot 51, with a swivel head 52 carried on a pedestal 53, the pedestal having a centering pin as 54 in its under-surface adapted to be received in any selected one of the holes 39 of the table or floor 38.

The connection of the tube 6 with the pedestal constitutes a universal joint from which it will be apparent that the tube 6, and hence the tube L if desired, may be moved at will either in a vertical plane about the pivot 51 or in a horizontal plane about the vertical pivot 55 of the swivel head 52.

In using the mechanism shown in these Figs. 7 and 8 the operator, having placed his work, that is the tube L with a flange G thereon, on the carriage 36, wheels it up to its desired position with respect to the stationary welding tool H with the parts which are to be welded positioned in proper relation to the electrodes 2—3. He then introduces the backing means 4—5 into the tube until the anvils 4—4 stand in proper co-operative relation with the electrodes, and then applies the welding current.

In order to determine the proper position of the anvils with respect to the electrodes he has merely to note the length of the tube 6 between the anvils and the pedestal 53 and then place his pedestal in a selected hole 39 which is of this distance from the electrodes.

He may obviously choose a hole of any selected one of the rows radially of the electrodes, according to different requirements of the work he has in hand.

For subsequent welds the operator simply throws back the lever 49 to release the anvils 4—4 and then re-places the work with respect to the electrodes. For this re-placement he may simply rotate the work about its own longitudinal axis without intentional movement of the carriage 36, or he may if desired swing the work laterally about the pivot 55 of the swivel head 52 so as to stand free of the welding tool, utilizing the carriage 36 for this purpose, as indicated in dotted lines in Fig. 7. If necessary he is at liberty to lift, or lower, the work, and with it the backing means 4—5, about the pivot 51 and to any extent during the operation of changing the position of the work with reference to the welding tool, and he may utilize the carriage 36 in any manner which will best suit his convenience by rolling it about to stand at any selected position upon the table or floor 38 most appropriate for the support of the work either during the operation of changing the position of the work or during the time while the work stands in welding relationship to the welding tool.

The carriage 36 may be used at any time to carry the tube L longitudinally so as to place the tube in position to receive welds at different longitudinal points.

The tube 6 and rod 7 as illustrated in the previous figures may if desired be made longitudinally adjustable the same as the rod 7 and tube 6 of Figs. 7 and 8, and when this is so the operator will of course make allowance therefor in selecting the proper point at which to place the finger 20, Fig. 1, in order to insure proper placement of the backing means 4—5.

As illustrated in the drawings Fig. 3, the manner of connecting the rod 7 with the lever 13, or 49, as the case may be, may provide for a relatively permanent adjustment of the wedge 5 with respect to the anvils 4—4. In Fig. 3 the outer end of the rod 7 is provided with a series of pivot apertures 56, 57 and 58 any one of which may be selectively employed to constitute the pivot 14.

This same arrangement may obviously be provided for connecting the rod 7 with lever 49 in Figs. 7 and 8 if desired.

If it is desired to use the backing means 4—5 within a relatively larger tube than that illustrated in Fig. 3 then the aperture 58 is employed to carry the pivot 14, the wedge 5 being drawn to the left proportionately and thereby spreading the anvils 4—4 for operation within the larger tube.

Where the tube 6 and rod 7 are made adjustable, as illustrated in Figs. 7 and 8, the different steps of adjustment may be numbered or lettered to correspond for instance with the numbering or lettering of the holes 39 thereby enabling the operator to more readily select the proper hole 39 when placing his pedestal 53. By noting, for example, that the left hand end of the tubular shell 41 is in register with the letter E on the tubular shell 42 as illustrated at 56 in Fig. 7, he knows that the centering pin 54 of the pedestal belongs in hole E on the floor 38 in order that the backing means 4—5 be in co-operative register with the welding tool.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention what I claim as new and desire to secure by Letters Patent is:—

1. In a device for spot welding members at different selected points exteriorly along the length of a metallic tube, means by which to support the tube, a welding tool including electrodes adapted for operation at different selected points exteriorly of the tube, backing means for insertion interiorly of the tube to prevent collapse of the tube during the welding operation, and means by which said backing means may be moved to different selected positions within the tube to mate different positions of said electrodes.

2. In a device for spot welding members at different selected points exteriorly along the length of a metallic tube, means by which to support the tube, a welding tool including electrodes adapted for operation at different selected points exteriorly of the tube, backing means for insertion interiorly of the tube to prevent collapse of the tube during the welding operation, and means by which said backing means may be moved to different selected positions, both longitudinally and rotatively within the tube to mate different positions of said electrodes.

3. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, and means by which said backing means may be moved to different selected positions within the tube, together with indicator means for indicating without the tube the position of said backing means within the tube.

4. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, and means by which said backing means may be moved to different selected positions rotatively within the tube.

5. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, and means by which said backing means may be moved to different selected positions rotatively within the tube, together with indicator means for indicating without the tube the rotary position of said backing means within the tube.

6. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, and means by which said backing means may be moved to different selected positions longitudinally within the tube.

7. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, and means by which said backing means may be moved to different selected positions longitudinally within the tube, together with indicator means for indicating without the tube the longitudinal position of said backing means within the tube.

8. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points exteriorly of the tube, and means by which said backing means may be moved to different positions to correspond with the operative positions of said electrodes.

9. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points exteriorly of the tube, and means by which said backing means may be moved to different positions to correspond with the operative positions of said electrodes, together with indicator means whereby to visually determine the corresponding positions of said electrodes and of said backing means.

10. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points rotatively of the exterior of the tube, and means by which said backing means may be moved to different rotative positions to correspond with the different rotative positions of said electrodes.

11. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points rotatively of the exterior of the tube, and means by which said backing means may be moved to different rotative positions to correspond with the different rotative positions of said electrodes, together with indicator means associated with said welding tool and other connector means associated with said backing means, said two indicator means being comparative with each other to determine co-operative relationship as between the rotative positions of the electrodes and of the backing means.

12. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points longitudinally of the exterior of the tube, and means by which said backing means may be moved to different longitudinal positions to correspond with the different longitudinal positions of said electrodes.

13. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said welding tool being movable so as to dispose said electrodes for operation at different points longitudinally of the exterior of the tube, and means by which said backing means may be moved to different longitudinal positions to correspond with the different longitudinal positions of said electrodes, together with indicator means associated with said welding tool and with said backing means by which to determine cooperative relationship as between the longitudinal positions of the electrodes and of the backing means.

14. In a device for spot welding members at different selected points exteriorly along the length of a metallic tube, means by which to support the tube including a table, a welding tool including electrodes for operation exteriorly of the tube, backing means for insertion interiorly of the tube to prevent collapse of the tube during the welding operation, and a carrier for said backing means by which said backing means may be moved about within the tube, said carrier being adapted to extend out of one end of the tube and having a supporting part connected therewith movable about upon the surface of the table.

15. In a device for spot welding members at different selected points exteriorly along the length of a metallic tube, means by which to support the tube including a table, a welding tool including electrodes for operation exteriorly of the tube, backing means for insertion interiorly of the tube to prevent collapse of the tube during the welding operation, and a carrier for said backing means by which said backing means may be moved about within the tube, said carrier being adapted to extend out of one end of the tube and having a supporting part connected therewith movable about upon the surface of the table, together with indicating means carried upon the surface of the table and co-operative with said carrier to indicate the position of said backing means within the tube.

16. In a device for spot welding members at different selected points exteriorly along the length of a metallic tube, means by which to support the tube, a welding tool including electrodes for operation exteriorly of the tube, backing means for insertion interiorly of the tube to prevent collapse of the tube during the welding operation, said backing means including a pair of anvils, and means by which to spread said anvils into tight engagement with opposite interior wall surfaces of the tube, said anvils and said spreading means having parts connected therewith of a character to extend exteriorly of the tube and by which to operate said spreading means.

17. In a device for spot welding members at different selected points exteriorly along the length of a metallic tube, means by which to support the tube including a table, a welding tool including electrodes for operation exteriorly of the tube, backing means for insertion interiorly of the tube to prevent collapse of the tube during the welding operation, and a carrier for said backing means by which said backing means may be moved about within the tube, said carrier being adapted to extend out of one end of the tube and having a supporting part connected therewith movable about upon the surface of the table, said supporting part being vertically adjustable to support said carrier at different selected levels about the table surface.

18. In a device for spot welding members at different selected points exteriorly along the length of a metallic tube, a welding tool including electrodes for operation exteriorly of the tube, means providing a surface upon which said welding tool is mounted, a carriage movable at will about said surface adapted to serve as a support by which to support the tube and by which to move the tube at will with respect to the electrodes of said welding tool, backing means for insertion interiorly of the tube to prevent collapse of the tube during the welding operation, a carrier for said backing means by which said backing means may be positioned within the tube in co-operative register with the electrodes of the welding tool, said carrier being adapted to extend out of one end of the tube and having a supporting pedestal at its outer end adapted to rest upon said surface, and indicator means provided upon said surface having reference to said electrodes of a character to determine the position of said pedestal to insure co-operative positioning of said backing means with respect to said electrodes.

19. In a device for spot welding members at different selected points exteriorly along the length of a metallic tube, a welding tool including electrodes for operation exteriorly of the tube, means by which to support the tube and by which the tube may be moved at will with respect to the electrodes of said welding tool, backing means for insertion interiorly of the tube to prevent collapse of the tube during the welding operation, a carrier for said backing means by which said backing means may be positioned within the tube in co-operative register with the electrodes of the welding tool, said carrier being adapted to extend out of one end of the tube whereby to manipulate the carrier from without the tube, and means whereby said carrier is adjustable in length.

20. In a device for spot welding members at different selected points exteriorly along the length of a metallic tube, a welding tool including electrodes for operation exteriorly of the tube, backing means for insertion in such tube and arranged for alignment with the electrodes, means pivotally supporting the backing means toward one end thereof beyond the end of the tube, means by which to support the tube and by which the tube and members may be moved at will with respect to the electrodes of the tool and relative to the backing means, said supporting means arranged to swing the tube and associated members laterally out of the welding tool about said pivot for the backing means to permit relative adjustment of the tube and members, electrodes and backing means.

CARL DE GANAHL.